US010438588B2

United States Patent
R et al.

(10) Patent No.: US 10,438,588 B2
(45) Date of Patent: Oct. 8, 2019

(54) SIMULTANEOUS MULTI-USER AUDIO SIGNAL RECOGNITION AND PROCESSING FOR FAR FIELD AUDIO

(71) Applicant: Intel Corporation, Santa Clara, CA (US)

(72) Inventors: Raghavendra Rao R, Bangalore (IN); Przemyslaw Maziewski, Gdansk (PL); Adam Kupryjanow, Gdansk (PL); Lukasz Kurylo, Gdansk (PL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/702,490

(22) Filed: Sep. 12, 2017

(65) Prior Publication Data

US 2019/0080692 A1     Mar. 14, 2019

(51) Int. Cl.
*G10L 15/20*     (2006.01)
*G10L 15/22*     (2006.01)
(Continued)

(52) U.S. Cl.
CPC .............. *G10L 15/22* (2013.01); *G10L 15/08* (2013.01); *G10L 17/005* (2013.01);
(Continued)

(58) Field of Classification Search
CPC ....... G10L 21/028; G10L 15/20; G10L 15/32; G10L 21/02; G10L 21/0208; G10L 15/00;
(Continued)

(56) References Cited

U.S. PATENT DOCUMENTS 7,174,022 B1 * 2/2007 Zhang .................... H04R 3/005
                                                                                       381/92
8,286,493 B2 * 10/2012 Bakish .................... G01H 9/00
                                                                                       73/596
(Continued)

FOREIGN PATENT DOCUMENTS

WO     WO2013168621     * 11/2013         G10L 25/48

OTHER PUBLICATIONS

Tran et al., ("Multi-speaker Beamforming for Voice Activity Classification", 2013, Australian Communications Theory Workshop (AusCTW), pp. 116-121), 2013.*

*Primary Examiner* — Vijay B Chawan
(74) *Attorney, Agent, or Firm* — Jaffery Watson Mendonsa & Hamilton LLP

(57) ABSTRACT

A mechanism is described for facilitating simultaneous recognition and processing of multiple speeches from multiple users according to one embodiment. A method of embodiments, as described herein, includes facilitating a first microphone to detect a first speech from a first speaker, and a second microphone to detect a second speech from a second speaker. The method may further include facilitating a first beam-former to receive and process the first speech, and a second beam-former to receive and process the second speech, where the first and second speeches are at least received or processed simultaneously. The method may further include communicating a first output associated with the first speech and a second output associated with the second speech to the first speaker and the second speaker, respectively, using at least one of one or more speaker devices and one or more display devices.

20 Claims, 8 Drawing Sheets

(51) Int. Cl.
*G10L 17/00* (2013.01)
*G10L 15/08* (2006.01)
*G10L 21/0272* (2013.01)
*H04R 1/40* (2006.01)
*G10L 21/0216* (2013.01)

(52) U.S. Cl.
CPC .... *G10L 21/0272* (2013.01); *G10L 2015/088* (2013.01); *G10L 2015/223* (2013.01); *G10L 2021/02166* (2013.01); *H04R 1/406* (2013.01)

(58) Field of Classification Search
CPC ....... G10L 15/005; G10L 15/04; G10L 15/16; G10L 15/18; G10L 15/1815; G10L 15/1822; G10L 15/26; G10L 15/265; G10L 15/34; G10L 21/0216; G10L 21/0232; G10L 21/0264; G10L 21/0272; G10L 25/21; G10L 25/93; H04R 3/005; H04R 1/406; H04R 25/407; H04R 25/50; H04R 25/505; H04R 25/558; H04R 1/1083; H04R 25/405; H04R 25/453; H04R 25/70; H04R 27/00; H04R 3/02; H04M 2203/509; H04M 3/42221; H04M 3/568; H04M 9/082
USPC ....... 704/226, 231, 233, 208, 246, 210, 215, 704/228, 239, 251; 379/202.01; 381/314, 56, 66, 92, 94.2, 94.3
See application file for complete search history.

(56) References Cited

U.S. PATENT DOCUMENTS

| | | | |
|---|---|---|---|
| 8,504,351 B2* | 8/2013 | Waibel | G06F 17/289 704/2 |
| 8,583,428 B2* | 11/2013 | Tashev | G10L 21/028 704/210 |
| 9,215,527 B1* | 12/2015 | Saric | H04R 3/005 |
| 9,629,367 B2* | 4/2017 | Wachendorff-Neumann | A01N 43/80 |
| 9,646,630 B2* | 5/2017 | Jothiswaran | G10L 21/0272 |
| 9,689,960 B1* | 6/2017 | Barton | G01S 3/8083 |
| 9,830,318 B2* | 11/2017 | Waibel | G06F 17/28 |
| 10,013,981 B2* | 7/2018 | Ramprashad | G10L 15/20 |
| 2002/0138254 A1* | 9/2002 | Isaka | G10L 21/02 704/208 |
| 2004/0249637 A1* | 12/2004 | Baker | G10L 15/1822 704/239 |
| 2011/0307251 A1* | 12/2011 | Tashev | G10L 21/028 704/231 |
| 2012/0224456 A1* | 9/2012 | Visser | G01S 3/8006 367/127 |
| 2013/0006624 A1* | 1/2013 | Bakish | G01H 9/00 704/233 |
| 2013/0022189 A1* | 1/2013 | Ganong, III | G10L 15/00 379/202.01 |
| 2013/0243227 A1* | 9/2013 | Kinsbergen | H04M 1/2475 381/314 |
| 2013/0272373 A1* | 10/2013 | Wong | H04N 19/00 375/240.01 |
| 2013/0304476 A1* | 11/2013 | Kim | H04N 7/15 704/270 |
| 2016/0150315 A1* | 5/2016 | Tzirkel-Hancock | H04R 3/005 381/66 |
| 2016/0275961 A1* | 9/2016 | Yu | G10K 11/16 |
| 2016/0358619 A1* | 12/2016 | Ramprashad | G10L 15/34 |
| 2017/0339495 A1* | 11/2017 | De Haan | H04R 25/405 |
| 2018/0033447 A1* | 2/2018 | Ramprashad | G10L 21/028 |
| 2018/0233160 A9* | 8/2018 | Jensen | G10L 21/0232 |

\* cited by examiner

SIMULTANEOUS MULTI-USER AUDIO SIGNAL RECOGNITION AND PROCESSING FOR FAR FIELD AUDIO

FIELD

Embodiments described herein relate generally to data processing and more particularly to facilitate simultaneous multi-user audio signal recognition and processing for far field audio.

BACKGROUND

Conventional voice-enabled devices are limited to recognizing a single speaker. In case of multiple speakers, conventional devices and techniques only allow for recognizing the first speaker's voice, while rejecting or ignoring the second speaker's voice as an undesired signal.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
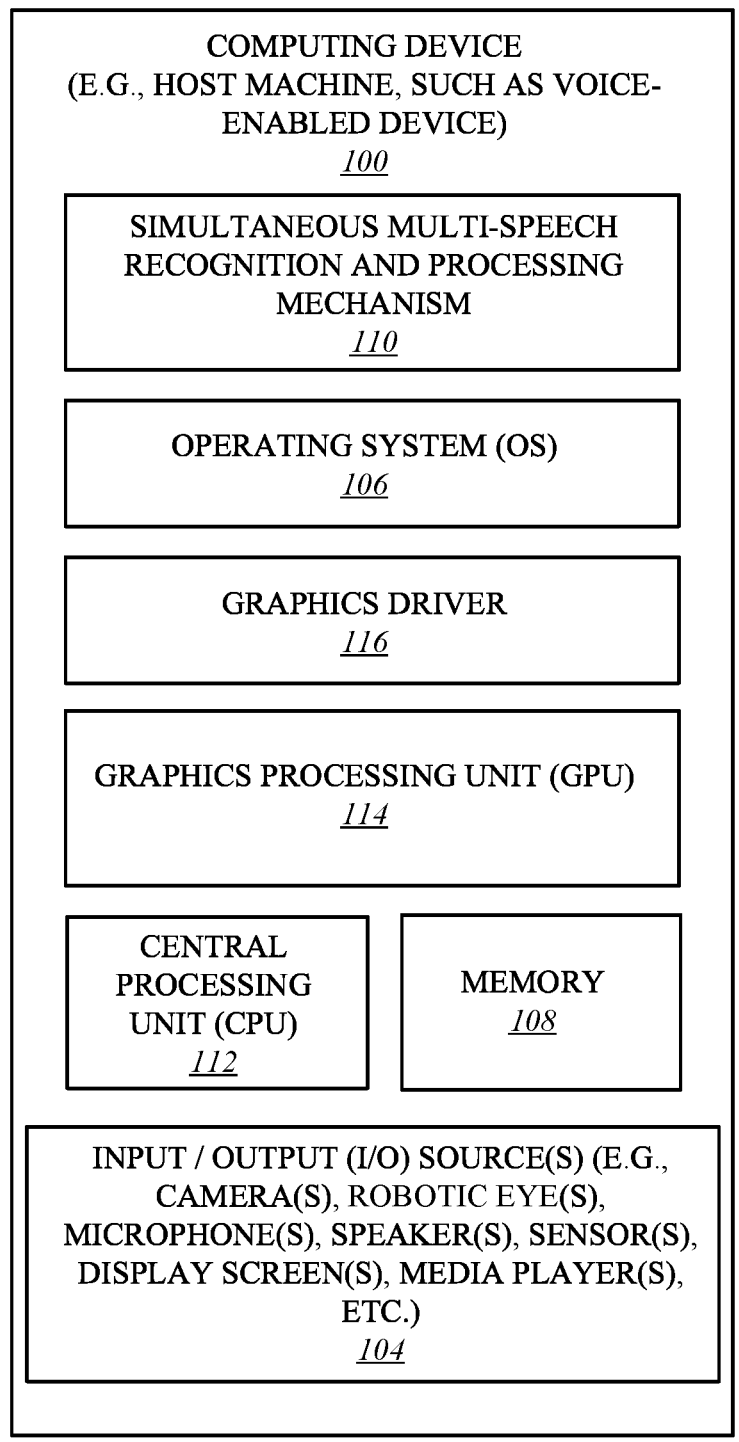
FIG. 1 illustrates a computing device hosting a simultaneous multi-speech recognition/processing mechanism according to one embodiment.

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a novel technique for recognizing, accepting, and processing multiple simultaneous speech interactions when dealing with multiple speakers. In one embodiment, multiple concurrent instances of beam formers and signal processing engines on Wake on Voice (WoV) pipeline and speech processing for automatic speech recognition (ASR) are used to enable multiple simultaneous speech interactions.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

It is to be noted that terms or acronyms like convolutional neural network (CNN), CNN, neural network (NN), NN, deep neural network (DNN), DNN, recurrent neural network (RNN), RNN, and/or the like, may be interchangeably referenced throughout this document. Further, terms like "autonomous machine" or simply "machine", "autonomous vehicle" or simply "vehicle", "autonomous agent" or simply "agent", "autonomous device" or "computing device", "robot", and/or the like, may be interchangeably referenced throughout this document.

FIG. 1 illustrates a computing device 100 employing a simultaneous multi-speech recognition/processing mechanism ("multi-speech mechanism") 110 according to one embodiment. Computing device 100 represents a communication and data processing device including or representing (without limitations) a voice-enabled device (VED), a voice command device (VCD), and/or the like. Throughout this document, computing device 100 may be interchangeably referred to as "smart voice device" or "smart voice-enabled device" or simply "voice device" that includes or works with or is embedded in or facilitates any number and type of smart devices, such as (without limitation) smart command devices or intelligent personal assistants (e.g., Echo® by Amazon.com®, etc.), home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet-based cable television set-top boxes, etc.), global positioning system (GPS)-based devices, etc.

In some embodiments, voice device 100 includes or works with or is embedded in or facilitates any number and type of other smart devices, such as (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, voice device 100 may include a computer platform hosting an integrated circuit ("IC"), such as a system on a chip ("SoC" or "SOC"), integrating various hardware and/or software components of voice device 100 on a single chip.

As illustrated, in one embodiment, voice device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), UMD, user-mode driver framework (UMDF), UMDF, or simply "driver") 116, central processing unit ("CPU" or simply "application processor") 112, memory 108, network devices, drivers, or the like, as well as input/output (I/O) sources 104, such as touchscreens, touch panels, touch pads, virtual or regular keyboards, virtual or regular mice, ports, connectors, etc. Voice device 100 may include operating system (OS) 106 serving as an interface between hardware and/or physical resources of the voice device 100 and a user.

It is to be appreciated that a lesser or more equipped system than the example described above may be preferred for certain implementations. Therefore, the configuration of voice device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

In one embodiment, as illustrated, multi-speech mechanism 110 may be hosted by operating system 106 in communication with I/O source(s) 104, such as microphone(s), of voice device 100. In another embodiment, multi-speech mechanism 110 may be hosted or facilitated by graphics driver 116. In yet another embodiment, multi-speech mechanism 110 may be hosted by or part of graphics processing unit ("GPU" or simply graphics processor") 114 or firmware of graphics processor 114. For example, multi-speech mechanism 110 may be embedded in or implemented as part of the processing hardware of graphics processor 114. Similarly, in yet another embodiment, multi-speech mechanism 110 may be hosted by or part of central processing unit ("CPU" or simply "application processor") 112. For example, multi-speech mechanism 110 may be embedded in or implemented as part of the processing hardware of application processor 112.

In yet another embodiment, multi-speech mechanism 110 may be hosted by or part of any number and type of components of voice device 100, such as a portion of multi-speech mechanism 110 may be hosted by or part of operating system 116, another portion may be hosted by or part of graphics processor 114, another portion may be hosted by or part of application processor 112, while one or more portions of multi-speech mechanism 110 may be hosted by or part of operating system 116 and/or any number and type of devices of computing device 1500. It is contemplated that embodiments are not limited to any particular implementation or hosting of multi-speech mechanism 110 and that one or more portions or components of multi-speech mechanism 110 may be employed or implemented as hardware, software, or any combination thereof, such as firmware.

Voice device 100 may host network interface(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
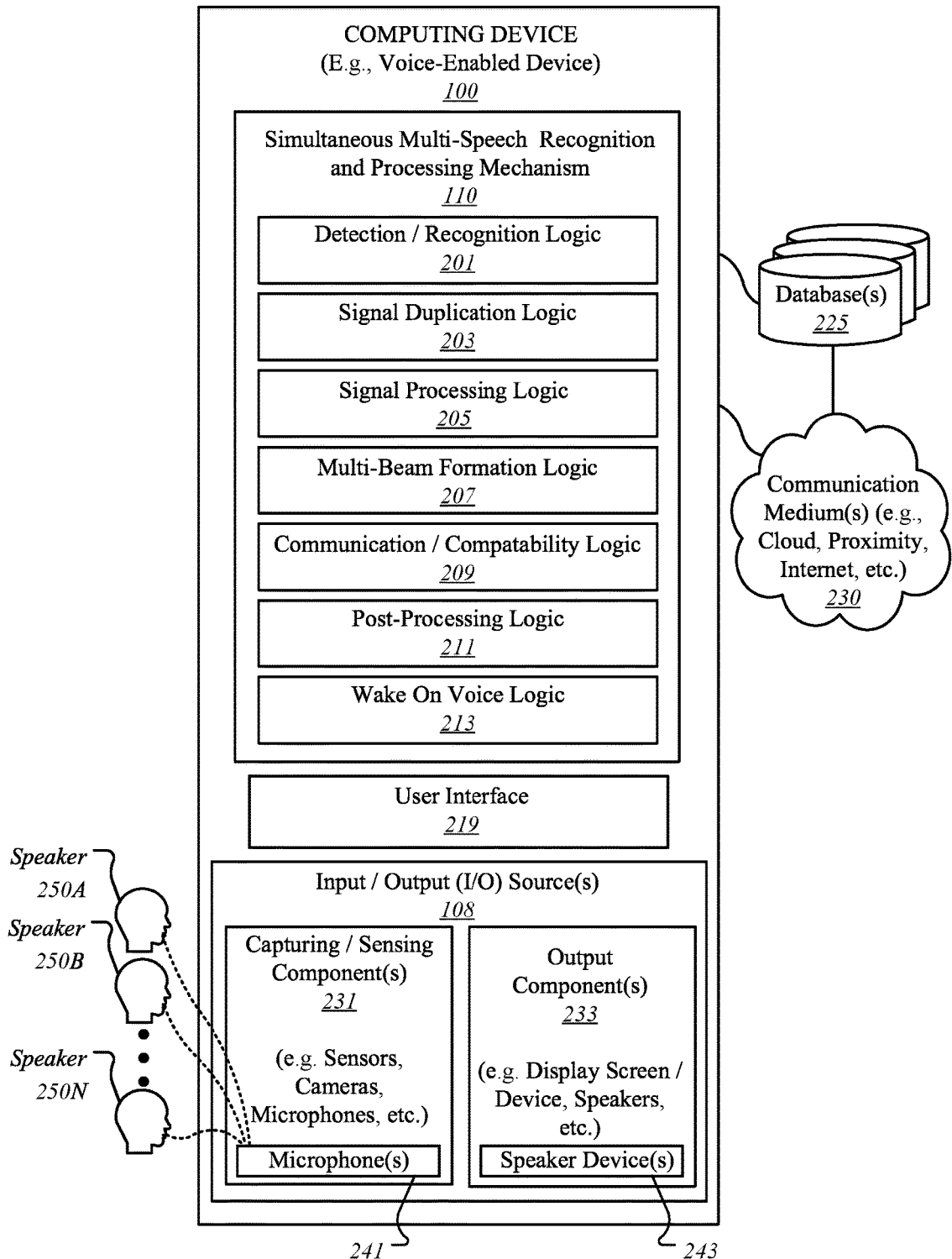
FIG. 2 illustrates simultaneous multi-speech recognition/processing mechanism according to one embodiment.

FIG. 2 illustrates simultaneous multi-speech recognition/processing mechanism 110 of FIG. 1 according to one embodiment. For brevity, many of the details already discussed with reference to FIG. 1 are not repeated or discussed hereafter. In one embodiment, multi-speech mechanism 110 may include any number and type of components, such as (without limitations): detection/recognition logic 201; signal duplication logic 203; signal processing logic 205; multi-beam formation logic 207; communication/compatibility logic 209; post-processing logic 211; and wake on voice logic 213.

Voice device 100 is further shown to include user interface 219 (e.g., graphical user interface (GUI)-based user interface, Web browser, cloud-based platform user interface, software application-based user interface, other user or application programming interfaces (APIs), etc.). Computing device 100 may further include I/O source(s) 108 having capturing/sensing component(s) 231, such as camera(s) (e.g., Intel® RealSense™ camera), sensors, microphones, etc., and output component(s) 233, such as display(s) (e.g., integral displays, tensor displays, projection screens, display screens, etc.), speakers, etc.

Voice device 100 is further illustrated as having access to and/or being in communication with one or more database(s) 225 and/or one or more of other computing devices over one or more communication medium(s) 230 (e.g., networks such as a cloud network, a proximity network, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, computing device 100 may host I/O sources 108 including capturing/sensing component(s) 231 and output component(s) 233. In one embodiment, capturing/sensing component(s) 231 may include sensor array (such as microphones or microphone array (e.g., ultrasound microphones), cameras or camera array (e.g., two-dimensional (2D) cameras, three-dimensional (3D) cameras, infrared (IR) cameras, depth-sensing cameras, etc.), capacitors, radio components, radar components, etc.), scanners, accelerometers, etc. Similarly, output component(s) 233 may include any number and type of display devices or screens, projectors, speakers, light-emitting diodes (LEDs), one or more speakers and/or vibration motors, etc.

For example, as illustrated, capturing/sensing component(s) 231 may include any number and type of microphones(s) 241, such as multiple microphones or a microphone array, such as ultrasound microphones, dynamic microphones, fiber optic microphones, laser microphones, etc. It is contemplated that microphone(s) 241 serve as input devices for accepting or receiving audio inputs (such as human voice) into voice device 100 and converting this audio or sound into electrical signals. It is contemplated that embodiments are not limited to any number or type of microphones and that voice device 100 may include multiple microphones 241 to detect speech or sound simultaneously from multiple users or speakers 250A, 250B, 250N as will be further described in this document.

Similarly, as illustrated, output component(s) 233 may include any number and type of speaker device(s) or speaker(s) 243 to serve as output devices for outputting or giving out audio from voice device 100 for any number or type of reasons, such as human hearing or consumption. For example, speaker(s) 243 work the opposite of microphone(s) 241 where speaker(s) 243 convert electric signals into sound.

To avoid any potential confusion of terms, it is contemplated and to be noted that "speakers" 250A-250N refer to users or individuals or humans who speak into voice device 100 using through their voices or sounds, while "speakers" or "speaker devices" 243 that are part of output component(s) 233, as mentioned above, refer to one or more output devices coupled to or embedded into voice device 100 to convert electric signals into sound.

Embodiments provide for a novel technique where voice device 100 accepts, recognizes, and processes multiple sounds/voices from multiple speakers 250A-N such as upon accepting the primary speaker, any secondary speakers are accepted as additional speakers. Further, in one embodiment, if multiples speakers 250A-N speak simultaneously or concurrently, multiple microphone(s) 241 of voice device 100 may be triggered to accept the multiple voices of multiple speakers 250A-N as facilitated by multi-speech mechanism 110. Further, each of the multiple voices or sounds are then processed by multi-speech mechanism 110 such that valid outputs or responses are offered to each of multiple speakers 250A-N in accordance with their requests.

For example, speaker 250A request that a television be turned on, while speaker 250B request a weather report for the day. In one embodiment, at least two of microphones 241 may be triggered to accept the inputs of the two voices of speakers 250A, 250B, which are then fully processed by multi-speech mechanism 110 to obtain the desired results. For example, upon processing the two requests, the television is turned on for speaker 250A, while a weather report is provided to speaker 250B, such as displaying the weather report on one or more display screens of voice device 100 or at another display device accessible to speaker 250B, etc.

In one embodiment, to communicate with voice device 100, speakers 250A-N may speak one or more of a word, a name, or a phrase (e.g., good morning, hello device, wake up device, hi Alice, etc.) in language or dialect or sound that is inputted through one or more of microphones 241 as facilitated by detection/recognition logic 201. Further, detection/recognition logic 201 may then detect and/or receive the word/phrase, recognize and/or verify the word/phrase, and then allow for speakers 250A-N to proceed with placing their service requests.

In one embodiment, a single microphone array, such as microphone(s) 241, may be used along with multiple beam formers, as facilitated by multi-beam formation logic 207, in the far field speech processing pipeline to support multiple users simultaneously and in parallel. For example, as will be further described with reference to FIG. 4A, multiple concurrent instances of beam formers and signal processing engines are used on a WoV pipeline and speech processing for an ASR pipeline to enable multiple simultaneous speech iterations from multiple speakers 250A-N.

It is contemplated that there may be any number and type of predefined and/or changing criteria use for selecting between different voices being uttered concurrently. For example, if closest proximity is a criterion, then the voice of one of the speakers, such as speaker 250A, who is physically closest to voice data 100 may be inputted first, followed by the voices of other speakers 250B-N. Other factors or criteria may include (but not limited to): 1) nature of the request (such as how long it might take to process the request, such as shorter ones may be processed first, followed by lengthy ones); 2) familiarity of the voice (such as the familiar voice of one of the speakers, such as speaker 250A, living in the house may be recognized and processed first, by virtue of priority, by voice device 100 before attending to the unfamiliar voices of the other vising speakers 250B-N), etc.

Similarly, in some embodiments, there may be one or more voice devices in addition to voice device 100 in a single physical location (such as in a house), in which case, multiple speeches from multiple speakers 250A-N may be picked by different microphones of different voice devices, such as microphone(s) 241 of voice device 100, based on any one or more of the factors described above.

In one embodiment, upon detecting and recognizing a speech (also referred to as "voice" or "sound") from one of speakers 250A-N, such as speaker 250A, the speech is then received at signal duplication logic 203, where signal duplication logic 203 not only ensures that the received speech is forwarded on to be processed through the WoV and speech processing chains or pipelines, but that these processing pipelines remain open for additional speeches from one or more of other speakers, such as speakers 250B-N.

In one embodiment, as soon as the key word or phrase is uttered by another user, such as speaker 250B, it is inputted through one of microphones 241 and further detected and recognized though detection/recognition logic 201. Once again, signal duplication logic 203 interfaces with the two processing pipelines to forward the second speech to be processed by the two processing pipelines while keeping open for any additional speeches.

In one embodiment, wake on voice logic 201 may be used to facilitate the WoV pipeline or one or more components of the WoV pipeline to recognize and evaluate the key phrase (also referred to as "wake-phrase") used by any of speakers 250A-N before the rest of their speech can be accepted. For example, once the key phrase is received at one of microphones 241, it may then be detected or recognized by detection/recognition logic 201 and subsequently, the key phase may be verified by wake on voice logic 201 as part of WoV pipeline and voice device 100 may then be used for additional speech, including service requests.

In one embodiment, these multiple speeches may be received simultaneously, triggering one or more microphones 241 through a key phrase, but are equally and concurrently treated, accepted, and processed through WoV and speech processing pipelines using this novel technique of having a multiple beam formation as facilitated by multi-beam formation logic 207.

For example, once these multiple speeches are received at the two processing pipelines, they are then processed through processing logic 205, where processing logic 205 evaluates these multiple speeches for the nature of their service requests, urgency, bandwidth, etc., and communicates the results of pre-processing evaluation to multi-beam formation logic 207.

In one embodiment, multi-beam formation logic 207 may then review the multiple speeches and any evaluation results obtained through processing at the WoV processing pipeline and subsequently triggers multiple corresponding beam-formers to be initiated at the speech processing pipeline. For example, in case of two speeches, two corresponding beam formers, such as beam-former 1 and beam-former 2, may be initiated at the speech processing pipeline to simultaneously work on the two speeches received from speaker 250A and 250B. It is contemplated that beam formation refers to a signal processing technique involving spatial filtering for directional signal reception and transmission.

In one embodiment, multiple speeches and other relevant data are processed for beam formation using multiple beam-formers and any results from beam formation are then put through a post processing stage at the speech processing pipeline. For example, the post processing stage may involve accumulating any necessary data corresponding to the service requests placed by speakers 250A, 250B through their speeches. For example, if speaker 250A requested a weather report, then the corresponding post-processing may involve gathering the weather data, such as from a website or other sources, so that the weather report may then be responded back to speaker 250A. It is contemplated that the resulting weather report may be communicated back to speaker 250A in a variety of ways, such as through sound using one or more speaker(s) 243, one or more display screens that are offered through output components 233 of voice device 100, one or more remote displays that either directly or indirectly coupled to voice device 100, such as a television, a computer monitor, a mobile device display screen, etc.

Similarly, for example, speaker 250B may have requested voice device 100 to turn on a television or a household appliance, etc. In this case, post processing may involve establishing the necessary all the necessary connections to issues instructions or messages to facilitate turning-on of the television in response to the request placed by speaker 250B. This and other aforementioned features will be further discussed with reference to one or more of the subsequent figures.

Capturing/sensing component(s) 231 may further include any number and type of cameras, such as depth-sensing cameras or capturing devices (e.g., Intel® RealSense™ depth-sensing camera) that are known for capturing still and/or video red-green-blue (RGB) and/or RGB-depth (RGB-D) images for media, such as personal media. Such images, having depth information, have been effectively used for various computer vision and computational photography effects, such as (without limitations) scene understanding, refocusing, composition, cinema-graphs, etc. Similarly, for example, displays may include any number and type of displays, such as integral displays, tensor displays, stereoscopic displays, etc., including (but not limited to) embedded or connected display screens, display devices, projectors, etc.

Capturing/sensing component(s) 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing component(s) 231 may further include one or more of supporting or supplemental devices for capturing and/or sensing of data, such as illuminators (e.g., IR illuminator), light fixtures, generators, sound blockers, etc.

It is further contemplated that in one embodiment, capturing/sensing component(s) 231 may further include any number and type of context sensors (e.g., linear accelerometer) for sensing or detecting any number and type of contexts (e.g., estimating horizon, linear acceleration, etc., relating to a mobile computing device, etc.). For example, capturing/sensing component(s) 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, capturing/sensing component(s) 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Capturing/sensing component(s) 231 may further include voice recognition devices, photo recognition devices, facial and other body recognition components, voice-to-text conversion components, etc.

Similarly, output component(s) 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any particular number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as voice device 100, and may be referenced interchangeably with "person", "individual", "human", "him", "her", "child", "adult", "viewer", "player", "gamer", "developer", "programmer", and/or the like.

Communication/compatibility logic 209 may be used to facilitate dynamic communication and compatibility between various components, networks, computing devices, database(s) 225, and/or communication medium(s) 230, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", and/or the like, may be referenced interchangeably and include, by way of example, software, hardware, and/or any combination of software and hardware, such as firmware. In one example, "logic" may refer to or include a software component that is capable of working with one or more of an operating system, a graphics driver, etc., of a computing device, such as voice device 100. In another example, "logic" may refer to or include a hardware component that is capable of being physically installed along with or as part of one or more system hardware elements, such as an application processor, a graphics processor, etc., of a computing device, such as voice device 100. In yet another embodiment, "logic" may refer to or include a firmware component that is capable of being part of system firmware, such as firmware of an application processor or a graphics processor, etc., of a computing device, such as voice device 100.

Further, any use of a particular brand, word, term, phrase, name, and/or acronym, such as "speech", "multi-speech", "voice device" "signal processing", "signal duplication", "beam-formers", "beam formation", "post processing", "wake-on-voice (WoV)", "wake phrase", "key phrase", "WoV processing chain", "WoV processing pipeline", "speech processing chain", "speech processing pipeline", "RealSense™ camera", "real-time", "automatic", "dynamic", "user interface", "camera", "sensor", "microphone", "display screen", "speaker", "verification", "authentication", "privacy", "user", "user profile", "user preference", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from multi-speech mechanism 110 to facilitate various embodiments including adding, removing, and/or enhancing certain features. For brevity, clarity, and ease of understanding of multi-speech mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 3A:
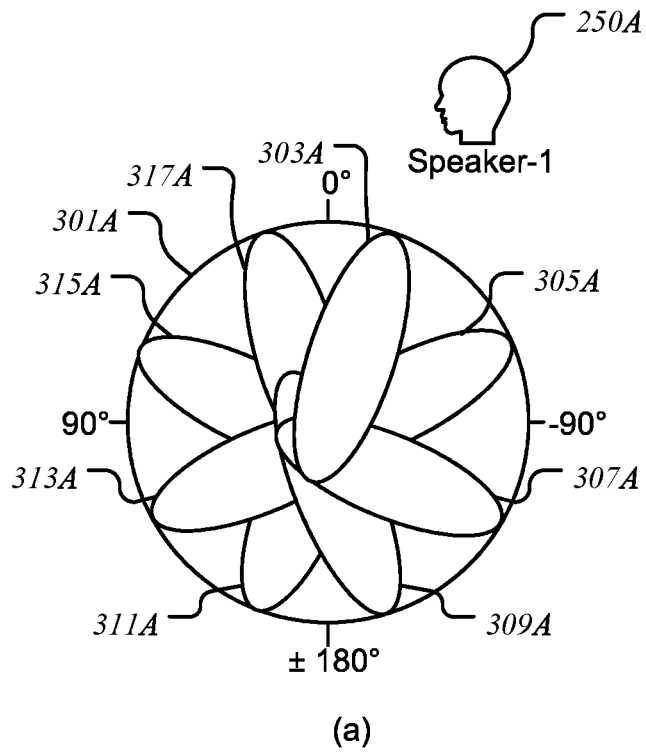
FIG. 3A illustrates multiple beam-formers for multi-user, multi-speech audio signal processing at a voice-enabled device according to one embodiment.
Figure 3A:
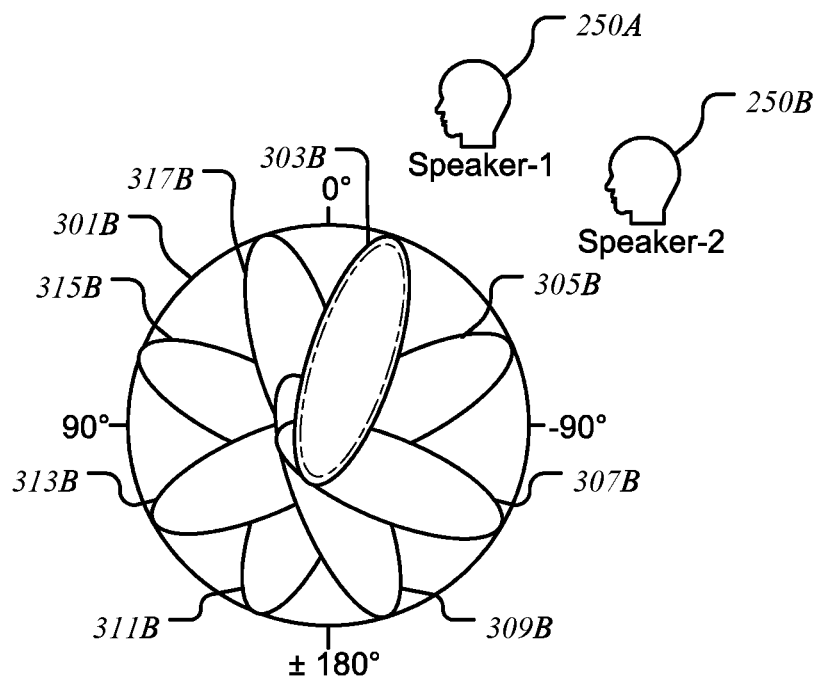

FIG. 3A illustrates multiple beam-formers 301A, 303B for multi-user, multi-speech audio signal processing at a voice-enabled device according to one embodiment. For brevity, many of the details previously discussed with reference to FIGS. 1-2 may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by multi-speech mechanism 110 of FIG. 1. The processes or transactions associated with this illustration may be illustrated or recited in linear sequences for brevity and clarity in presentation; however, it is contemplated that any number of them can be performed in parallel, asynchronously, or in different orders.

As previously discussed, conventional techniques are limited to a single user, where if a second user speaks into a conventional voice-enabled device, while a first user is still speaking, the conventional voice-enabled device would simple reject or ignore the second user. In other words, convention voice-enabled devices are incapable of receiving voices/sounds from multiple speakers unless the second person speaks after the first person is finished with their interaction. Thus, conventional systems are severely limited in their use as they lack any support for concurrent multi-user interaction.

Embodiments provide for a voice device, such as voice device 100 of FIG. 1, that accepts, recognizes, and processes multiple speeches from multiple users simultaneously or concurrently. In one embodiment, this novel voice device 100 of FIG. 1 is introduced to allow for and enable multiple users to have simultaneous voice interactions with voice device 100. For example, a novel setup for WoV processing pipeline and speech processing pipeline is offered for overcoming the conventional single user limitation of conventional devices. In one embodiment, a novel beam former, such as beam-former 301A, 301B, may be used as part of a WoV pipeline to allow for concurrent speeches from multiple speakers, such as speakers 250A, 250B.

As illustrated, in one embodiment, beam-former 303A of multiple beam-formers 301A is shown as actively performing speech interaction with speaker 1 250A, while other beam-formers 305A, 307A, 309A, 311A, 313A, 313A, 315A, 317A are ready and on standby in case another user speaks into the voice device. Now, as illustrated, in one embodiment, when another user, such as speaker 2 250B, speaks into the voice device, the next in line beam-former, such as beam-former 305A of multiple beam-formers 301A is now activated as beam-former 305B of multiple beam-former 301B to receive the speech and perform speech interaction with speaker 2 250B, while other beam-formers 307B, 309B, 311B, 313B, 313B, 315B, 317B remain ready for another potential user and their speech.

Further, in one embodiment, the change of shade of beam-former 303B indicates that the key phrase spoken by speaker 1 250A was recognized and accept by a WoV component of the WoV processing pipeline as facilitated by wake on voice logic 213 of FIG. 2. Once the key phrase from speaker 1 250A is accepted, WoV processing pipeline may then be ready to accept key phrases and speeches from other users, such as speaker 2 250B, through beam-former 305B without being affected by the command or speech pronounced by speaker 1 250A. The two users 1 250A, 2 250B may continue to concurrently speak into and interact with the voice device or in some embodiments, depending on the preferences or settings, speaker 2 250B may be picked up in favor of speaker 1 250A.

Figure 3B:
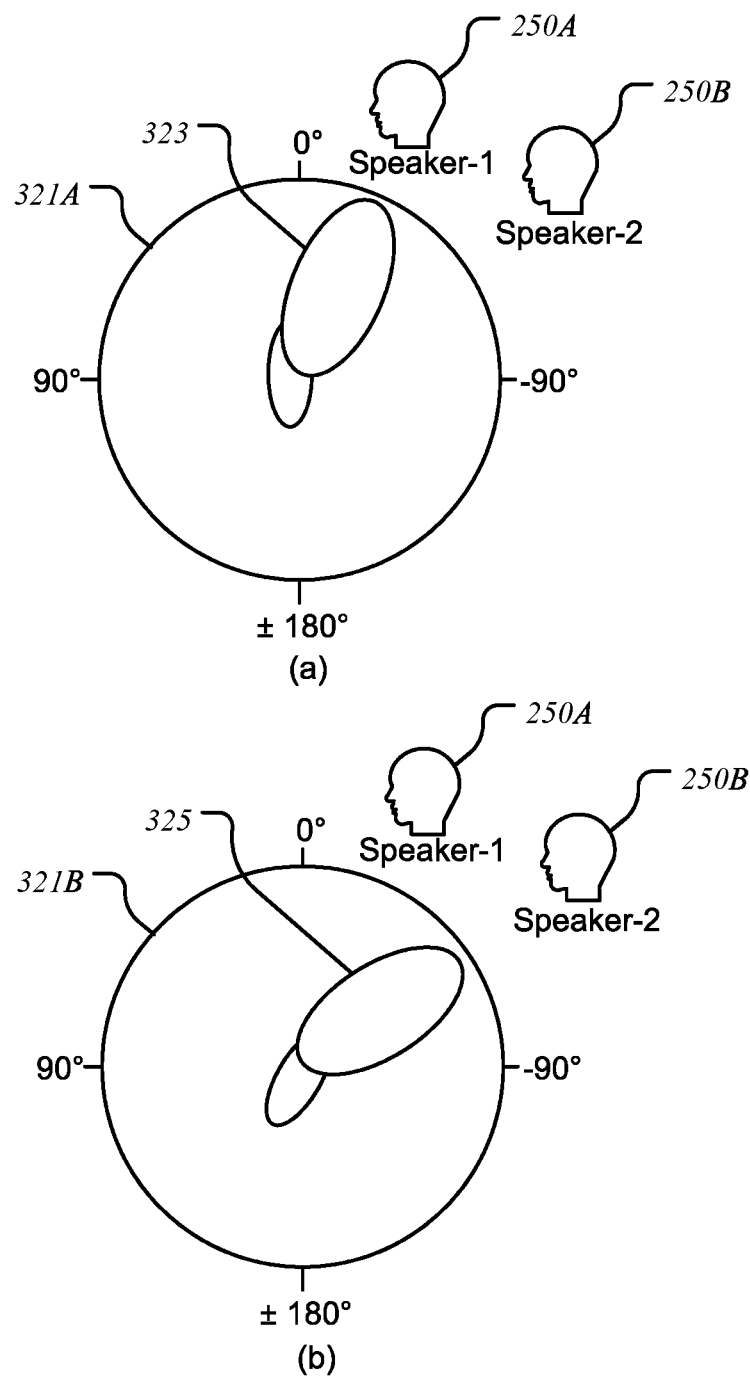
FIG. 3B illustrates multiple beam-formers for multi-user, multi-speech audio signal processing at a voice-enabled device according to one embodiment.

FIG. 3B illustrates multiple beam-formers 321A, 321B for multi-user, multi-speech audio signal processing at a voice-enabled device according to one embodiment. For brevity, many of the details previously discussed with reference to FIGS. 1-3A may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by multi-speech mechanism 110 of FIG. 1. The processes or transactions associated with this illustration may be illustrated or recited in linear sequences for brevity and clarity in presentation; however, it is contemplated that any number of them can be performed in parallel, asynchronously, or in different orders.

As described with reference to FIG. 3A, in one embodiment, once a key phrase is spoken by a first user, such as speaker 1 250A, received through beam-former 323 of multiple beam-formers 321A, and recognized by a voice device, beam-former 325 of multiple beam-former 321B may then be ready to receive and recognize the key phrase and then the speech from a second user, such as speaker 2 250B. In the illustrated embodiment, multiple beam-formers 321A are transcended into multiple beam-formers 321B such that beam-former 323 and bean-former 325, respectively, can simultaneously accept speeches from two corresponding speakers 1 250A, 2 250B. These two streams of audio (from the two speeches) may then be processed and decoded with the beam-former configurations as illustrated here.

Figure 3C:
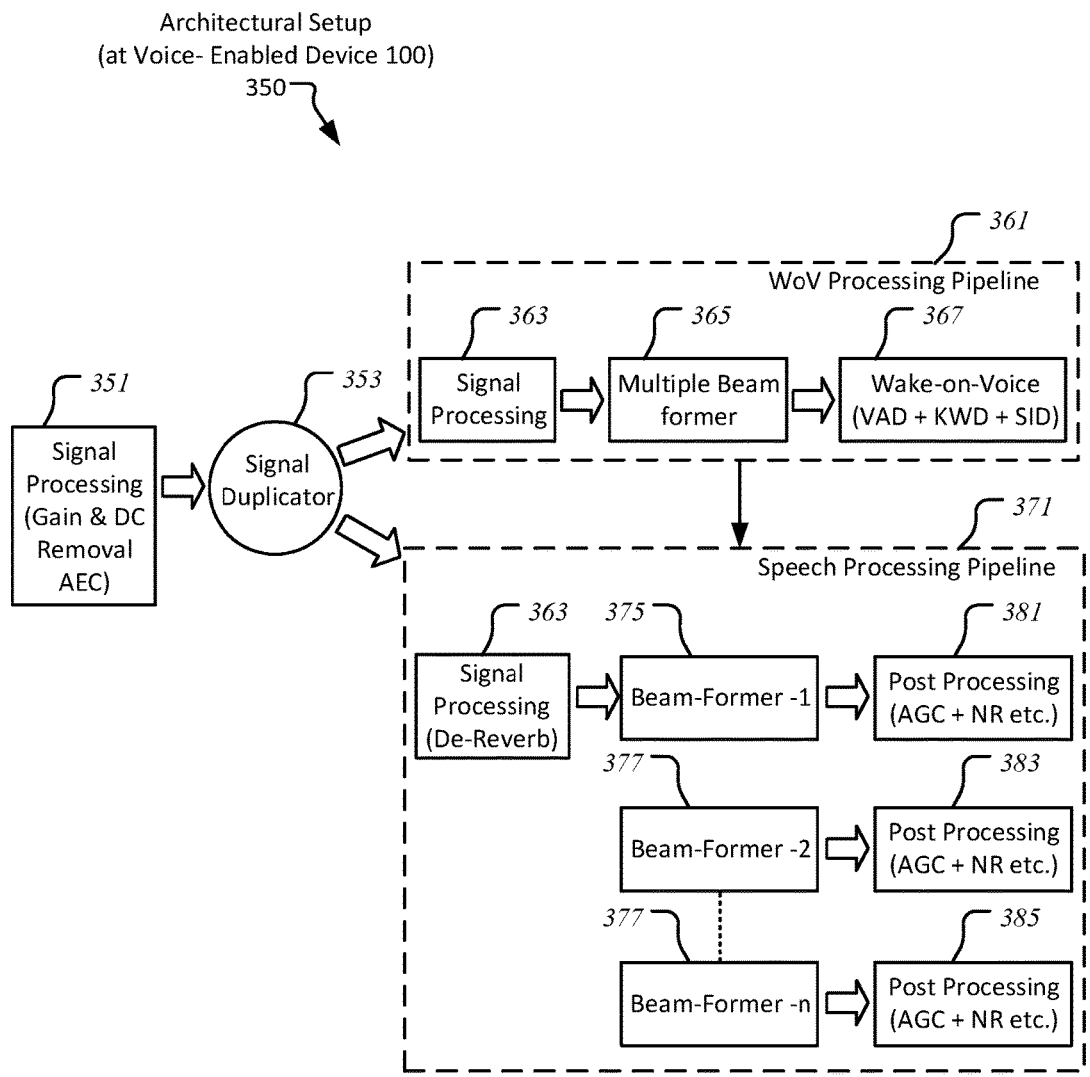
FIG. 3C illustrates an architectural setup for multi-user, multi-speech audio signal processing at a voice-enabled device according to one embodiment.

FIG. 3C illustrates an architectural setup 350 for multi-user, multi-speech audio signal processing at a voice-enabled device according to one embodiment. For brevity, many of the details previously discussed with reference to FIGS. 1-3B may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by multi-speech mechanism 110 of FIG. 1. The processes or transactions associated with this illustration may be illustrated or recited in linear sequences for brevity and clarity in presentation; however, it is contemplated that any number of them can be performed in parallel, asynchronously, or in different orders.

In one embodiment, this architectural setup is hosted by a voice-enabled device, such as voice device 100 of FIG. 1. As illustrated, in one embodiment, signal processing 351 may be initiated or triggered, as facilitated by signal processing logic 205 of FIG. 2, once a key word or phrase is spoken by a speaker within a certain proximity of the voice device and one or more of its microprocessors, such as microprocessor(s) 241 of FIG. 1. Once the key phrase is recognized and verified by the voice device, as facilitated by wake on voice logic 213 of FIG. 2, the speaker may then speak into the one or more microprocessors of the voice device with additional speech, such as seeking a service (e.g., requesting searches, asking to perform tasks, controlling household devices, etc.).

For example, certain operations may be performed at or by signal processing 351, such as raw signals from the audio of the speech may be processed for DC removal, signal amplification, and acoustic echo cancellation (AEC), etc. In one embodiment, signal duplicator 353, as facilitated by signal duplication logic 203 of FIG. 2, may be used to select or duplicate between WoV processing pipeline 361 or speech processing pipeline 371 for further processing of the audio stream of the speech, where signal duplicator 353 is further to accept multiple speeches or audio streams from signal processing 351, while concurrently working with or between both pipelines 361, 371.

Further, as facilitated by signal processing logic 205 of FIG. 2, optional signal processing 363 and 373 may be offered at WoV pipeline 361 and speech pipeline 371, respectively. In one embodiment, for example, signal processing 373 may contain or offer multiple beam-formers 375, 377, 379 at speech pipeline 371 associated with multiple beam former 365 at WoV pipeline 361, where multiple beam formers 375, 377, 379 may be used to recognize the direction of the voice, detection of voice activation, detection of key phrase, and identification of the speaker, and/or the like. Further, as illustrated, signal processing 373 at speech pipeline 371 may contain de-reverberation followed by multiple beam-formers 375, 377, 379 and their corresponding post-processing 381, 383, 385 for producing output for the ASR engine.

As illustrated, WoV pipeline 361 further includes wake on voice 367, as facilitated by wake on voice logic 213 of FIG. 2, to assign, accept, and recognize any number and type of key phrases, such as hello, wake up, hi there, etc. Once the key phrase is recognized, the voice device is ready to accept additional speakers. For example, WoV pipeline 361 may not close after the detection of the key phrase from the first speaker, while the key phrase and any preceding noise data are used to update or adjust the fixed direction beam-formers 375, 377, 379. For example, a first speaker may not be as desirable as a second speaker, such as for covariance matrix based beam formers, the noise covariance matrix and the corresponding filters may be updated by using a key phrase signal from the already-recognized speakers. This may change the beam frequency response and geometrical shape resulting in attenuation of the first speaker in all of the fixed direction beam-formers 375, 377, 379.

Further, in one embodiment, when the second key phrase is detected, a beam-former, such as beam-former 375, of speech processing pipeline 371 corresponding with the first speaker recalculates any filters to remove any speech interference from the second speaker. For example, for covariance matrix-based beam-formers, such as beam-formers 375, 377, 379, the covariance matrix of noise and source are updated by adding the covariance matrix calculated from the buffer containing the second key phrase spoken by the second user. Further, any beam-former filters may also be recalculated, wherein first beam-former 375 of speech pipeline 371 dedicated to the first speaker may start to remove any speech from the second user so as not to interfere with the first speech by the first speaker.

Similarly, for example, second beam-former 377 of speech pipeline 371 dedicated to the second speech by the second speaker may go with a similar approach, but treat the first speech by the first speaker as undesired signal so as not to interfere with the second speech by the second speaker. This is so the first speaker's speech is preserved and processed, while the second speaker's second speech is also listened to and processed accordingly and concurrently.

Figure 4:
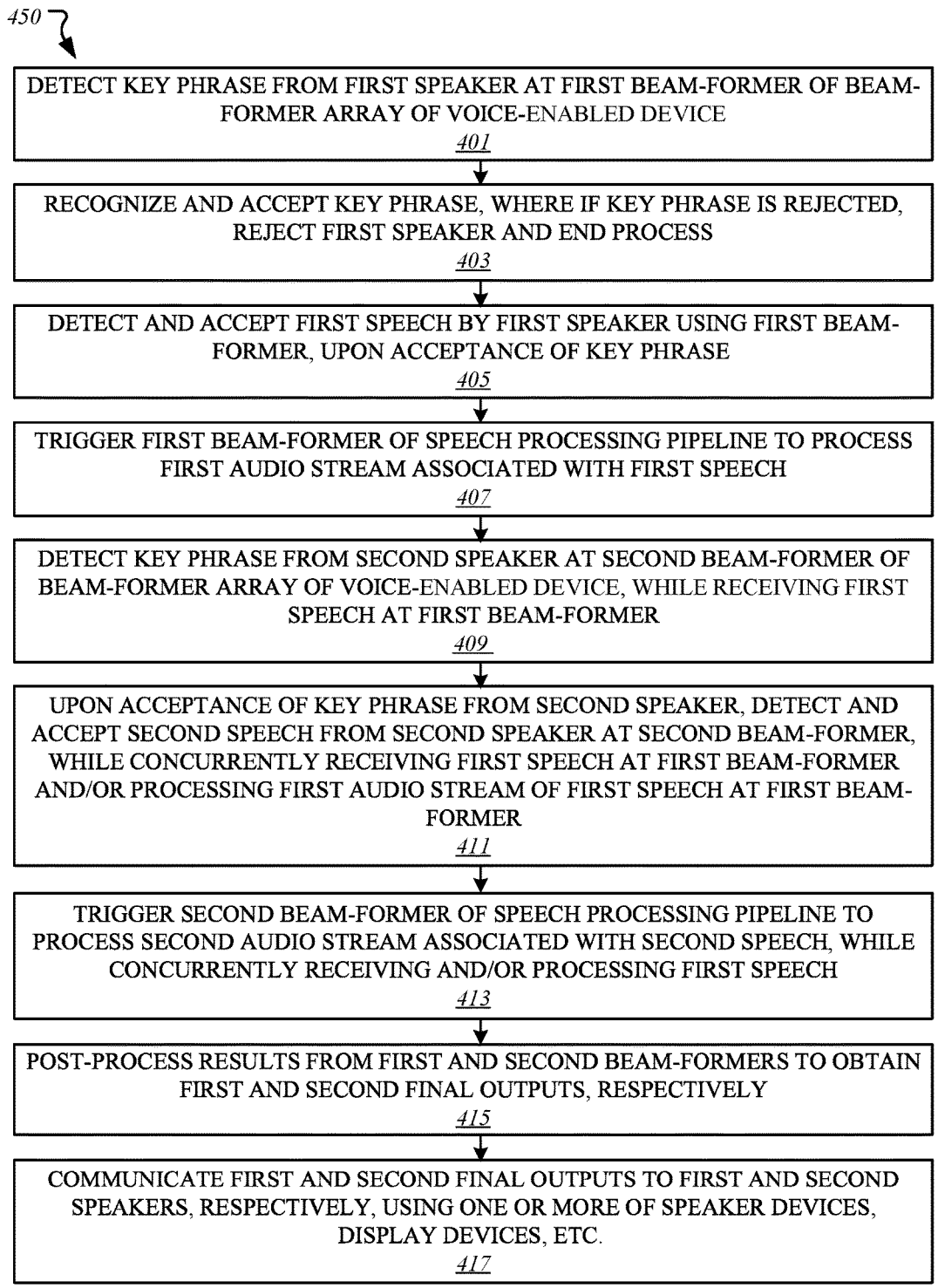
FIG. 4 illustrates a method for multi-user, multi-speech processing at a voice-enabled device according to one embodiment.

FIG. 4 illustrates a method 400 for multi-user, multi-speech processing at a voice-enabled device according to one embodiment. For brevity, many of the details previously discussed with reference to FIGS. 1-3C may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by multi-speech mechanism 110 of FIG. 1. The processes or transactions associated with this illustration may be illustrated or recited in linear sequences for brevity and clarity in presentation; however, it is contemplated that any number of them can be performed in parallel, asynchronously, or in different orders.

Method 400 begins at block 401 with detecting a key phrase spoken by a first speaker, where the key phrase is detected by a first beam-former of multiple beam-formers of a voice-enabled device according to one embodiment, where each beam former may be associated with at least one microphone of a microphone array at the voice device. At block 403, the key phrase is recognized and accepted by WoV component associated with a WoV processing pipeline. If the key phrase is not recognized or rejected, the first speaker is also rejected and the process ends right way. At block 405, once the key phrase is accepted, the first speaker speaks into the voice device, where this first speech is detected by the first beam-former and, at block 407, the first audio stream of the first speech is processed by the beam-former associated with a speech processing pipeline.

At block 409, in one embodiment, a second beam-former of multiple beam-formers may be used to detect the key phrase spoken by a second speaker simultaneously while continuously detecting and processing the first speech through the first beam-former and a corresponding first microphone. At block 411, upon acceptance of the key phrase by the second speaker, a second beam-former is triggered to receive and accept a second speech by the second speaker, while receiving and accepting the first speech from the first speaker at the first beam-former.

At block 413, the second beam-former associated with the speech processing pipeline is triggered to process the second audio stream of the second speech by the second speaker, while concurrently receiving and/or processing the first speech at the first beam-former. At block 415, any results obtained from the first and second beam-formers are post-processed for generating first and second final outputs, respectively. At block 417, the first and second final outputs are then communicated back to the first and second speakers, respectively, through one or more speaker devices, one or more display devices, etc.

Figure 5:
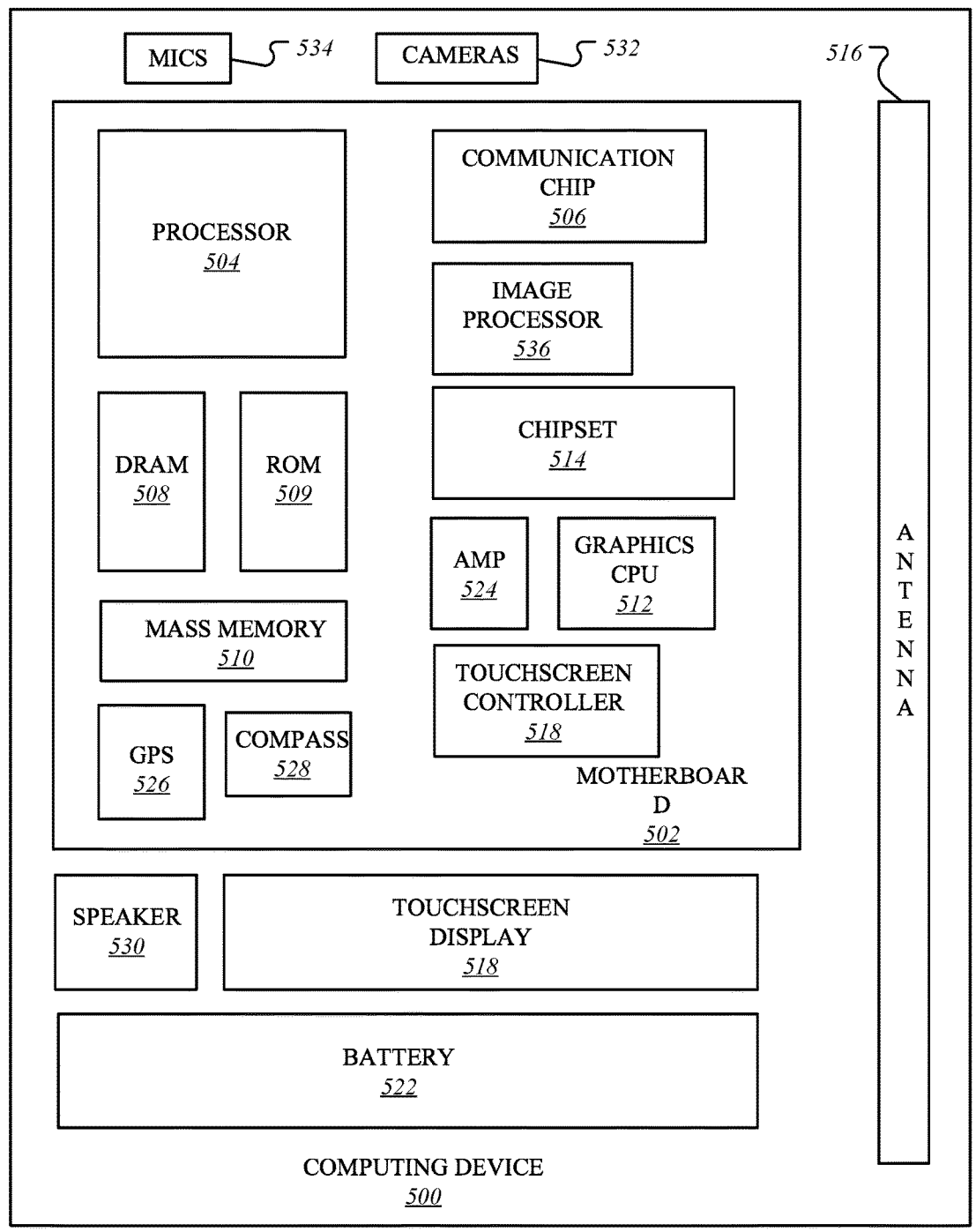
FIG. 5 illustrates a computer device capable of supporting and implementing one or more embodiments according to one embodiment.

FIG. 5 illustrates a computing device 500 in accordance with one implementation. The illustrated computing device 500 may be same as or similar to computing device 100 of FIG. 1. The computing device 500 houses a system board 502. The board 502 may include a number of components, including but not limited to a processor 504 and at least one communication package 506. The communication package is coupled to one or more antennas 516. The processor 504 is physically and electrically coupled to the board 502.

Depending on its applications, computing device 500 may include other components that may or may not be physically and electrically coupled to the board 502. These other components include, but are not limited to, volatile memory (e.g., DRAM) 508, non-volatile memory (e.g., ROM) 509, flash memory (not shown), a graphics processor 512, a digital signal processor (not shown), a crypto processor (not shown), a chipset 514, an antenna 516, a display 518 such as a touchscreen display, a touchscreen controller 520, a battery 522, an audio codec (not shown), a video codec (not shown), a power amplifier 524, a global positioning system (GPS) device 526, a compass 528, an accelerometer (not shown), a gyroscope (not shown), a speaker 530, cameras 532, a microphone array 534, and a mass storage device (such as hard disk drive) 510, compact disk (CD) (not shown), digital versatile disk (DVD) (not shown), and so forth). These components may be connected to the system board 502, mounted to the system board, or combined with any of the other components.

The communication package 506 enables wireless and/or wired communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 506 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 500 may include a plurality of communication packages 506. For instance, a first communication package 506 may be dedicated to shorter range wireless communications such as Wi-Fi and Bluetooth and a second communication package 506 may be dedicated to longer range wireless communications such as GPS, EDGE, GPRS, CDMA, WiMAX, LTE, Ev-DO, and others.

The cameras 532 including any depth sensors or proximity sensor are coupled to an optional image processor 536 to perform conversions, analysis, noise reduction, comparisons, depth or distance analysis, image understanding and other processes as described herein. The processor 504 is coupled to the image processor to drive the process with interrupts, set parameters, and control operations of image processor and the cameras. Image processing may instead be performed in the processor 504, the graphics CPU 512, the cameras 532, or in any other device.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 500 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Figure 6:
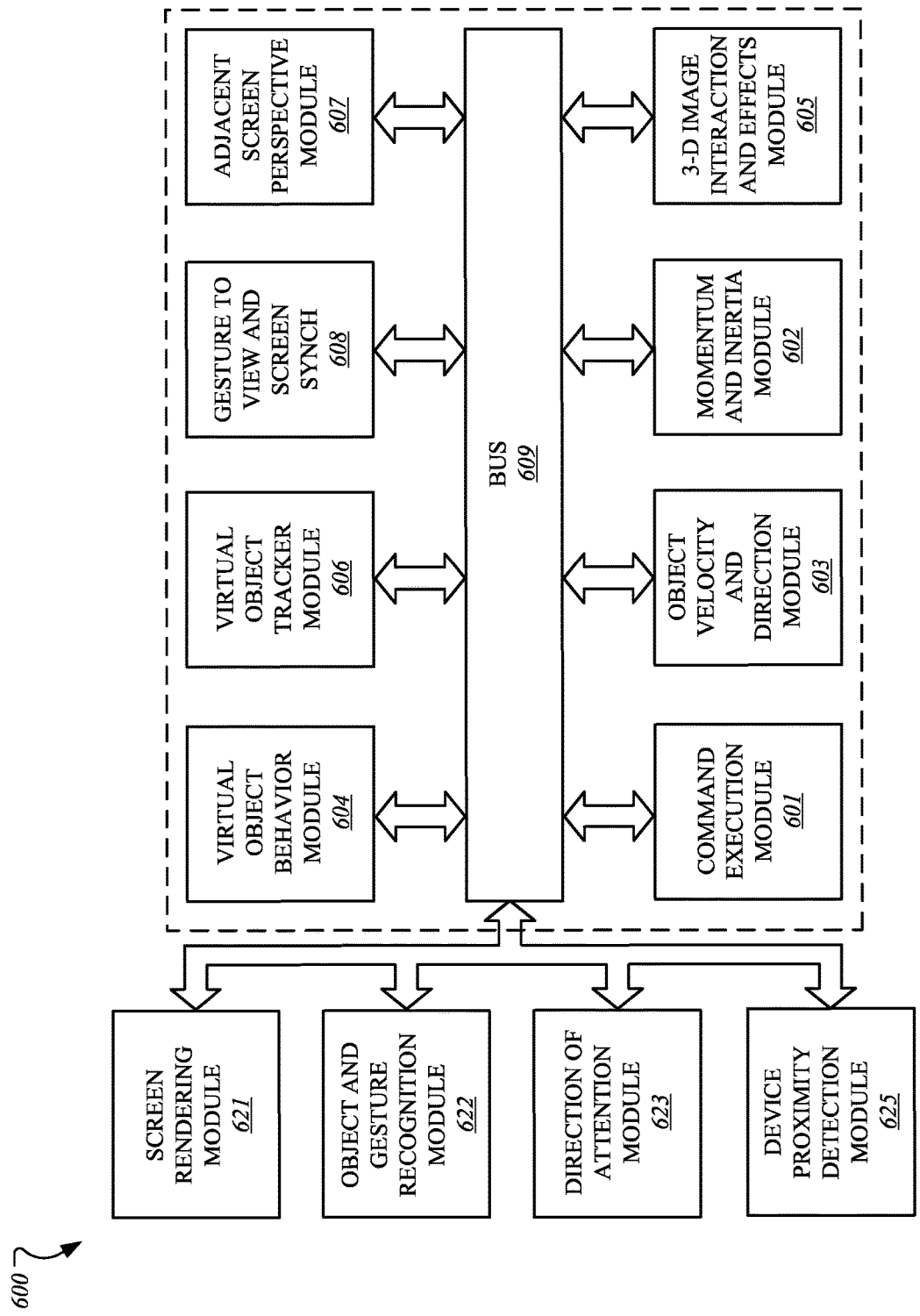
FIG. 6 illustrates an embodiment of a computing environment capable of supporting and implementing one or more embodiments according to one embodiment.

FIG. 6 illustrates an embodiment of a computing environment 600 capable of supporting the operations discussed above. The modules and systems can be implemented in a variety of different hardware architectures and form factors including that shown in FIG. 5.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition Module 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition Module 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition Module 622. Various views of an application on one or more screens can be associated with alternative gesture libraries or a set of gesture templates for a given view. As an example, in FIG. 1A, a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual objects across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition Module 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601, 602, 603, 604, 605, 606, 607, and 608 are connected via an interconnect or a bus, such as bus 609.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate simultaneous recognition and processing of multiple speeches from multiple users, the apparatus comprising: detection/recognition logic to facilitate a first microphone to detect a first speech from a first speaker, and a second microphone to detect a second speech from a second speaker; multi-beam formation logic to facilitate a first beam-former to receive and process the first speech, and a second beam-former to receive and process the second speech, wherein the first and second speeches are at least received or processed simultaneously; and communication/compatibility logic to communicate a first output associated with the first speech and a second output associated with the second speech to the first speaker and the second speaker, respectively, using at least one of one or more speaker devices and one or more display devices.

Example 2 includes the subject matter of Example 1, further comprising wake on voice logic to receive and accept or reject a key phrase spoken by the first and second speakers such that the first and second speeches are received from the first and second speakers, respectively, contingent upon approval or rejection of the key phrase, wherein the first and second speakers include users having access to the apparatus including a voice-enabled device.

Example 3 includes the subject matter of Examples 1-2, further comprising signal processing logic to perform initial processing of first and second audio signals associated with the first and second speeches, respectively, wherein initial processing includes one or more of initial assessment, DC removal, and signal application.

Example 4 includes the subject matter of Examples 1-3, further comprising post processing logic to perform final processing of the first and second audio signals, wherein final processing includes generating the first and second outputs to be communicated to the first and second speakers, respectively.

Example 5 includes the subject matter of Examples 1-4, further comprising signal duplication logic to receive multiple audio signals associated with multiple speeches including the first and second audio signals associated with the first and second speeches, respectively, wherein the signal duplication logic is further to communicate the multiple audio signals with at least one of a wake-on-voice processing pipeline and the speech processing pipeline.

Example 6 includes the subject matter of Examples 1-5, wherein the speech processing pipeline offers an array of beam-formers to simultaneously process the multiple speeches, wherein the array of beam-formers includes the first and second beam-formers, and wherein the apparatus to host an array of microphones to concurrently detect the multiple speeches, wherein the array of microphones includes the first and second microphones.

Example 7 includes the subject matter of Examples 1-6, wherein the apparatus comprises one or more processors including a graphics processor co-located with an application processor on a common semiconductor package.

Some embodiments pertain to Example 8 that includes a method facilitating simultaneous recognition and processing of multiple speeches from multiple users, the method comprising: facilitating a first microphone to detect a first speech from a first speaker, and a second microphone to detect a second speech from a second speaker; facilitating a first beam-former to receive and process the first speech, and a second beam-former to receive and process the second speech, wherein the first and second speeches are at least received or processed simultaneously; and communicating a first output associated with the first speech and a second output associated with the second speech to the first speaker and the second speaker, respectively, using at least one of one or more speaker devices and one or more display devices.

Example 9 includes the subject matter of Example 8, further comprising receiving and accepting or rejecting a key phrase spoken by the first and second speakers such that the first and second speeches are received from the first and second speakers, respectively, contingent upon approval or rejection of the key phrase, wherein the first and second speakers include users having access to a voice-enabled device.

Example 10 includes the subject matter of Examples 8-9, further comprising performing initial processing of first and second audio signals associated with the first and second speeches, respectively, wherein initial processing includes one or more of initial assessment, DC removal, and signal application.

Example 11 includes the subject matter of Examples 8-10, further comprising performing final processing of the first and second audio signals, wherein final processing includes generating the first and second outputs to be communicated to the first and second speakers, respectively.

Example 12 includes the subject matter of Examples 8-11, further comprising: receiving multiple audio signals associated with multiple speeches including the first and second audio signals associated with the first and second speeches, respectively; and communicating the multiple audio signals with at least one of a wake-on-voice processing pipeline and the speech processing pipeline.

Example 13 includes the subject matter of Examples 8-12, wherein the speech processing pipeline offers an array of beam-formers to simultaneously process the multiple speeches, wherein the array of beam-formers includes the first and second beam-formers, and wherein the voice-enabled device to host an array of microphones to concurrently detect the multiple speeches, wherein the array of microphones includes the first and second microphones.

Example 14 includes the subject matter of Examples 8-13, wherein the voice-enabled device comprises one or more processors including a graphics processor co-located with an application processor on a common semiconductor package.

Some embodiments pertain to Example 15 that includes a data processing system comprising a computing device having memory coupled to a processor, the processor to: facilitate a first microphone to detect a first speech from a first speaker, and a second microphone to detect a second speech from a second speaker; facilitate a first beam-former to receive and process the first speech, and a second beam-former to receive and process the second speech, wherein the first and second speeches are at least received or processed simultaneously; and communicate a first output associated with the first speech and a second output associated with the second speech to the first speaker and the second speaker, respectively, using at least one of one or more speaker devices and one or more display devices.

Example 16 includes the subject matter of Example 15, wherein the processor is further to receive and accept or reject a key phrase spoken by the first and second speakers such that the first and second speeches are received from the first and second speakers, respectively, contingent upon approval or rejection of the key phrase, wherein the first and second speakers include users having access to the computing device including a voice-enabled device.

Example 17 includes the subject matter of Examples 15-16, wherein the processor is further to perform initial processing of first and second audio signals associated with the first and second speeches, respectively, wherein initial processing includes one or more of initial assessment, DC removal, and signal application.

Example 18 includes the subject matter of Examples 15-17, wherein the processor is further to perform final processing of the first and second audio signals, wherein final processing includes generating the first and second outputs to be communicated to the first and second speakers, respectively.

Example 19 includes the subject matter of Examples 15-18, wherein the processor is further to: receive multiple audio signals associated with multiple speeches including the first and second audio signals associated with the first and second speeches, respectively; and communicate the multiple audio signals with at least one of a wake-on-voice processing pipeline and the speech processing pipeline.

Example 20 includes the subject matter of Examples 15-19, wherein the speech processing pipeline offers an array of beam-formers to simultaneously process the multiple speeches, wherein the array of beam-formers includes the first and second beam-formers, and wherein the voice-enabled device to host an array of microphones to concurrently detect the multiple speeches, wherein the array of microphones includes the first and second microphones.

Example 21 includes the subject matter of Examples 15-20, wherein the computing device comprises one or more processors including a graphics processor co-located with an application processor on a common semiconductor package.

Some embodiments pertain to Example 22 that includes an apparatus to facilitate simultaneous recognition and processing of multiple speeches from multiple users, the apparatus comprising: means for facilitating a first microphone to detect a first speech from a first speaker, and a second microphone to detect a second speech from a second speaker; means for facilitating a first beam-former to receive and process the first speech, and a second beam-former to receive and process the second speech, wherein the first and second speeches are at least received or processed simultaneously; and means for communicating a first output associated with the first speech and a second output associated with the second speech to the first speaker and the second speaker, respectively, using at least one of one or more speaker devices and one or more display devices.

Example 23 includes the subject matter of Example 22, further comprising means for receiving and accepting or rejecting a key phrase spoken by the first and second speakers such that the first and second speeches are received from the first and second speakers, respectively, contingent upon approval or rejection of the key phrase, wherein the first and second speakers include users having access to the apparatus including a voice-enabled device.

Example 24 includes the subject matter of Examples 22-23, further comprising means for performing initial processing of first and second audio signals associated with the first and second speeches, respectively, wherein initial processing includes one or more of initial assessment, DC removal, and signal application.

Example 25 includes the subject matter of Examples 22-24, further comprising means for performing final processing of the first and second audio signals, wherein final processing includes generating the first and second outputs to be communicated to the first and second speakers, respectively.

Example 26 includes the subject matter of Examples 22-25, further comprising: means for receiving multiple audio signals associated with multiple speeches including the first and second audio signals associated with the first and second speeches, respectively; and means for communicating the multiple audio signals with at least one of a wake-on-voice processing pipeline and the speech processing pipeline.

Example 27 includes the subject matter of Examples 22-25, wherein the speech processing pipeline offers an array of beam-formers to simultaneously process the multiple speeches, wherein the array of beam-formers includes the first and second beam-formers, and wherein the voice-enabled device to host an array of microphones to concurrently detect the multiple speeches, wherein the array of microphones includes the first and second microphones.

Example 28 includes the subject matter of Examples 22-25, wherein the apparatus comprises one or more processors including a graphics processor co-located with an application processor on a common semiconductor package.

Example 29 includes at least one non-transitory or tangible machine-readable medium comprising a plurality of instructions, when executed on a computing device, to implement or perform a method as claimed in any of claims or examples 8-14.

Example 30 includes at least one machine-readable medium comprising a plurality of instructions, when executed on a computing device, to implement or perform a method as claimed in any of claims or examples 8-14.

Example 31 includes a system comprising a mechanism to implement or perform a method as claimed in any of claims or examples 8-14.

Example 32 includes an apparatus comprising means for performing a method as claimed in any of claims or examples 8-14.

Example 33 includes a computing device arranged to implement or perform a method as claimed in any of claims or examples 8-14.

Example 34 includes a communications device arranged to implement or perform a method as claimed in any of claims or examples 8-14.

Example 35 includes at least one machine-readable medium comprising a plurality of instructions, when executed on a computing device, to implement or perform a method or realize an apparatus as claimed in any preceding claims.

Example 36 includes at least one non-transitory or tangible machine-readable medium comprising a plurality of instructions, when executed on a computing device, to implement or perform a method or realize an apparatus as claimed in any preceding claims.

Example 37 includes a system comprising a mechanism to implement or perform a method or realize an apparatus as claimed in any preceding claims.

Example 38 includes an apparatus comprising means to perform a method as claimed in any preceding claims.

Example 39 includes a computing device arranged to implement or perform a method or realize an apparatus as claimed in any preceding claims.

Example 40 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   one or more processors to:
   facilitate a first microphone to detect a first speech from a first speaker, and a second microphone to detect a second speech from a second speaker, wherein the first and second microphones to concurrently and separately detect the first and second speeches, respectively, such that the first microphone is temporarily dedicated to detect the first speech and the second microphone is temporarily dedicated to detect the second speech;
   facilitate a first beam-former to receive and process the first speech, and a second beam-former to receive and process the second speech, wherein the first and second speeches are at least received or processed simultaneously; and
   communicate a first output associated with the first speech and a second output associated with the second speech to the first speaker and the second speaker, respectively, using at least one of one or more speaker devices and one or more display devices.

2. The apparatus of claim 1, wherein the one or more processors are further to receive and accept or reject a key phrase spoken by the first and second speakers such that the first and second speeches are received from the first and second speakers, respectively, contingent upon approval or rejection of the key phrase, wherein the first and second speakers include users having access to the apparatus including a voice-enabled device.

3. The apparatus of claim 1, wherein the one or more processors are further to perform initial processing of first and second audio signals associated with the first and second speeches, respectively, wherein initial processing includes one or more of initial assessment, DC removal, and signal application.

4. The apparatus of claim 1, wherein the one or more processors are further to perform final processing of the first and second audio signals, wherein final processing includes generating the first and second outputs to be communicated to the first and second speakers, respectively.

5. The apparatus of claim 1, wherein the one or more processor are further to:
   receive multiple audio signals associated with multiple speeches including the first and second audio signals associated with the first and second speeches, respectively; and
   communicate the multiple audio signals with at least one of a wake-on-voice processing pipeline and the speech processing pipeline.

6. The apparatus of claim 5, wherein the speech processing pipeline offers an array of beam-formers to simultaneously process the multiple speeches, wherein the array of beam-formers includes the first and second beam-formers, and wherein the apparatus to host an array of microphones to concurrently detect the multiple speeches, wherein the array of microphones includes the first and second microphones.

7. The apparatus of claim 1, wherein the one or more processors including a graphics processor co-located with an application processor on a common semiconductor package.

8. A method comprising:
  facilitating a first microphone to detect a first speech from a first speaker, and a second microphone to detect a second speech from a second speaker, wherein the first and second microphones to concurrently and separately detect the first and second speeches, respectively, such that the first microphone is temporarily dedicated to detect the first speech and the second microphone is temporarily dedicated to detect the second speech;
  facilitating a first beam-former to receive and process the first speech, and a second beam-former to receive and process the second speech, wherein the first and second speeches are at least received or processed simultaneously; and
  communicating a first output associated with the first speech and a second output associated with the second speech to the first speaker and the second speaker, respectively, using at least one of one or more speaker devices and one or more display devices.

9. The method of claim 8, further comprising receiving and accepting or rejecting a key phrase spoken by the first and second speakers such that the first and second speeches are received from the first and second speakers, respectively, contingent upon approval or rejection of the key phrase, wherein the first and second speakers include users having access to a voice-enabled device.

10. The method of claim 8, further comprising performing initial processing of first and second audio signals associated with the first and second speeches, respectively, wherein initial processing includes one or more of initial assessment, DC removal, and signal application.

11. The method of claim 8, further comprising performing final processing of the first and second audio signals, wherein final processing includes generating the first and second outputs to be communicated to the first and second speakers, respectively.

12. The method of claim 8, further comprising:
  receiving multiple audio signals associated with multiple speeches including the first and second audio signals associated with the first and second speeches, respectively; and
  communicating the multiple audio signals with at least one of a wake-on-voice processing pipeline and the speech processing pipeline.

13. The method of claim 12, wherein the speech processing pipeline offers an array of beam-formers to simultaneously process the multiple speeches, wherein the array of beam-formers includes the first and second beam-formers, and wherein the voice-enabled device to host an array of microphones to concurrently detect the multiple speeches, wherein the array of microphones includes the first and second microphones.

14. The method of claim 12, wherein the voice-enabled device comprises one or more processors including a graphics processor co-located with an application processor on a common semiconductor package.

15. At least one non-transitory machine-readable medium comprising instructions which, when executed by a computing device, cause the computing device to perform operations comprising:
  facilitating a first microphone to detect a first speech from a first speaker, and a second microphone to detect a second speech from a second speaker, wherein the first and second microphones to concurrently and separately detect the first and second speeches, respectively, such that the first microphone is temporarily dedicated to detect the first speech and the second microphone is temporarily dedicated to detect the second speech;
  facilitating a first beam-former to receive and process the first speech, and a second beam-former to receive and process the second speech, wherein the first and second speeches are at least received or processed simultaneously; and
  communicating a first output associated with the first speech and a second output associated with the second speech to the first speaker and the second speaker, respectively, using at least one of one or more speaker devices and one or more display devices.

16. The non-transitory machine-readable medium of claim 15, wherein the operations further comprise receiving and accepting or rejecting a key phrase spoken by the first and second speakers such that the first and second speeches are received from the first and second speakers, respectively, contingent upon approval or rejection of the key phrase, wherein the first and second speakers include users having access to the computing device including a voice-enabled device.

17. The non-transitory machine-readable medium of claim 15, wherein the operations further comprise performing initial processing of first and second audio signals associated with the first and second speeches, respectively, wherein initial processing includes one or more of initial assessment, DC removal, and signal application.

18. The non-transitory machine-readable medium of claim 15, wherein the operations further comprise performing final processing of the first and second audio signals, wherein final processing includes generating the first and second outputs to be communicated to the first and second speakers, respectively.

19. The non-transitory machine-readable medium of claim 15, wherein the operations further comprise:
  receiving multiple audio signals associated with multiple speeches including the first and second audio signals associated with the first and second speeches, respectively; and
  communicating the multiple audio signals with at least one of a wake-on-voice processing pipeline and the speech processing pipeline.

20. The non-transitory machine-readable medium of claim 19, wherein the speech processing pipeline offers an array of beam-formers to simultaneously process the multiple speeches, wherein the array of beam-formers includes the first and second beam-formers, and wherein the computing device to host an array of microphones to concurrently detect the multiple speeches, wherein the array of microphones includes the first and second microphones, wherein the computing device comprises one or more processors including a graphics processor co-located with an application processor on a common semiconductor package.

* * * * *